United States Patent
Andersen et al.

(10) Patent No.: US 10,622,923 B2
(45) Date of Patent: Apr. 14, 2020

(54) SUB-SYNCHRONOUS RESONANCE DAMPING

(71) Applicant: VESTAS WIND SYSTEMS A/S, Aarhus N (DK)

(72) Inventors: Gert Karmisholt Andersen, Hovedgård (DK); Ciprian Biris, Hinnerup (DK); Yi Zhou, Hefei (CN); Manoj Gupta, Singapore (SG); Vajira Suminda Ganepola, Singapore (SG); Uffe C. Merrild, Bryrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/575,618

(22) PCT Filed: Jun. 9, 2016

(86) PCT No.: PCT/DK2016/050172
§ 371 (c)(1),
(2) Date: Nov. 20, 2017

(87) PCT Pub. No.: WO2017/000945
PCT Pub. Date: Jan. 5, 2017

(65) Prior Publication Data
US 2018/0159453 A1    Jun. 7, 2018

(30) Foreign Application Priority Data
Jun. 29, 2015   (DK) .................................. 2015 70402

(51) Int. Cl.
*H02P 9/00*   (2006.01)
*H02P 9/10*   (2006.01)

(52) U.S. Cl.
CPC .............. *H02P 9/007* (2013.01); *H02P 9/006* (2013.01); *H02P 9/102* (2013.01)

(58) Field of Classification Search
CPC ........ F03D 15/20; F03D 7/0272; F03D 9/255; F03B 17/06; H02P 2101/10; H02P 27/06;
(Continued)

(56) References Cited

U.S. PATENT DOCUMENTS

| 4,208,687 A | 6/1980 | Sun et al. |
| 4,329,637 A | 5/1982 | Kotake et al. |

(Continued)

FOREIGN PATENT DOCUMENTS

| WO | 2011/112571 A2 | 9/2011 |
| WO | 2013185772 A2 | 12/2013 |

OTHER PUBLICATIONS

Danish Search Report for Application No. PA 2015 70402 dated Mar. 17, 2016.
International Search Report dated Apr. 10, 2016 for Application No. PCT/DK2016/050172.
(Continued)

*Primary Examiner* — Julio C. Gonzalez
(74) *Attorney, Agent, or Firm* — Patterson + Sheridan, LLP

(57) ABSTRACT

A method is provided of controlling a doubly fed induction generator—(DFIG) wind turbine converter system if a sub-synchronous resonance event acts on the wind turbine. According to the method a sub-synchronous resonance event is detected. Thereupon, a switch from a non-SSR-control mode to a SSR-control mode is performed. At least one of the following activities is performed in the SSR-control mode, namely: (i) freezing rotor AC voltages in magnitude and phase, (ii) altering at least one rotor-current-controller gain (iii) altering at least one rotor-current-controller time constant, to dampen the effect of the SSR-event on the wind turbine.

18 Claims, 10 Drawing Sheets

(58) Field of Classification Search
CPC .. H02P 9/305; H02P 2101/15; H02P 2101/20; H02P 9/007; H02P 9/006; H02P 9/102
USPC ..................................................... 290/44, 55
See application file for complete search history.

(56) References Cited

U.S. PATENT DOCUMENTS

| | | | |
|---|---|---|---|
| 2012/0139243 A1 | 6/2012 | Koerber | |
| 2012/0299305 A1* | 11/2012 | Brogan | H02J 3/386 290/55 |
| 2013/0027994 A1* | 1/2013 | Nelson | H02P 9/105 363/40 |
| 2013/0200621 A1* | 8/2013 | Andresen | F03D 7/0284 290/44 |
| 2016/0254769 A1* | 9/2016 | Ren | H02P 9/105 290/44 |
| 2017/0353036 A1* | 12/2017 | Gil Lizarbe | H02J 3/386 |

OTHER PUBLICATIONS

Ghofrani M et al: 11 Modeling and simulation of a DFIG-based wind-power system for stability analysis Nov. 2012 IEEE Power and Energy Society General Meeting . • San Diego, Cali forni a, USA; Jul. 22-26, 2012, IEEE, Piscataway, NJ, Jul. 22, 2012 (Jul. 22, 2012), pp. 1-8, XP032466293, DOI: 10.1109/PESGM.2012. 6345680 ISBN: 978-1-4673-2727-5.
Garth D Irwin et al: 11 Sub-synchronous control interactions between type 3 wind turbines and series compensated AC transmission systems 11Power and Energy Society General Meeting, 2011 IEEE, IEEE, Jul. 24, 2011 (Jul. 24, 2011), pp. 1-6, XP032055467, DOI: 10.1109/PES.2011.6039426 ISBN: 978-1-4577-1000-1 [Absract Only].
Lingling Fan et al: 11 Modeling of DFIG-Based Wind Farms for SSR Analysis 11 , IEEE Transactions on Power Delivery, IEEE Service Center, New York, NY, US, vol. 25, No. 4, Oct. 1, 2010 (Oct. 1, 2010), pp. 2073-2082, XP011317839, ISSN: 0885-8977.

\* cited by examiner

SUB-SYNCHRONOUS RESONANCE DAMPING

FIELD OF THE INVENTION

The invention relates to the field of controlling a doubly-fed induction generator (DFIG) wind turbine converter system if a sub-synchronous resonance event in the grid acts on the wind turbine generator- and converter-system.

BACKGROUND

US 2013/0027994 A1 describes an arrangement of an SSR filter in the stator circuit and a PID current controller. The target values of the PID current controller are altered by a filtered out SSR-current component in order to provide a target value for a turbine-converter voltage controller that injects voltage into the grid according to that target value in order to cancel the SSR voltage in the system.

SUMMARY OF THE INVENTION

According to a first aspect, a method is provided of controlling a doubly-fed induction generator (DFIG) wind turbine converter system in the case of a sub-synchronous resonance event acting on the wind turbine. The method comprises:
  detecting the sub-synchronous resonance event,
  switching from a non-SSR-control mode to an SSR-control mode in response to the detection of the sub-synchronous resonance event, wherein the SSR-control mode comprises at least one of:
  (i) freezing rotor AC voltages in magnitude and phase,
  (ii) altering at least one rotor-current-controller gain, and
  (iii) altering at least one rotor-current-controller time constant.

According to a second aspect, a wind turbine converter system is provided, arranged to control a doubly fed induction generator (DFIG) wind turbine converter system in the case of a sub-synchronous resonance event acting on the wind turbine. The converter system is arranged to:
  detect a sub-synchronous resonance event,
  switch from a non-SSR-control mode to an SSR-control mode in response to the detection of the sub-synchronous resonance event, wherein the SSR-control mode comprises at least one of:
  (i) freezing rotor AC voltages in magnitude and phase,
  (ii) altering at least one rotor-current-controller gain, and
  (iii) altering at least one rotor-current-controller time constant.

GENERAL DESCRIPTION, ALSO OF OPTIONAL EMBODIMENTS OF THE INVENTION

According to a first aspect, a method is provided of controlling a doubly fed induction generator (DFIG) wind turbine converter system in the case of a sub-synchronous resonance event acting on the wind turbine is provided. The converter system is connected to a rotor of the doubly fed induction generator by the generator-side inverter of the converter system and to fixed frequency AC electricity grid (50 or 60 Hz) by the grid-side inverter of the converter systems. The generator-stator is directly connected to said fixed AC frequency electricity-grid.

In general, the sub-synchronous resonance (SSR) phenomenon occurs in electrical power systems as a result of the interaction of a turbine-generator with a long-distance series-compensated power-transmission line, i.e. power-transmission lines with a capacitance connected in series to said power-transmission line. Thereby, sub-synchronous resonance events are, in general, responsive to the series-compensation level of the power-transmission line.

In the case of a sub-synchronous resonance event, the electrical network exchanges energy with the wind turbine generator at frequencies less than the nominal frequency of the electricity-grid (e.g. 50 or 60 Hz). Such sub-synchronous frequencies lie typically in a range between 15 and 45 Hz. Sub-synchronous resonance is addressed in three categories, the induction generator effect, torsional interaction and torque amplification. The methods described in this application mainly address the induction generator effect.

In the induction generator effect, sub-harmonic currents in the grid, caused by inserting the series compensation, will cause a sub-synchronous magnetic field in the rotor, which in turn leads to a sub-synchronous rotating magnetomotive force (mmf) acting on the rotor. The rotor circuit responds to the sub-synchronous magnetic flux associated with that force in a similar manner to a common induction generator. As the rotor rotation frequency is typically greater than the SSR-frequency of the sub-synchronous fields in the rotor, the slip is negative for these frequency components. Hence, the wind turbine generator (the asynchronous machine) is in a generating mode for these sub-synchronous frequency components.

As the rotor-circuit's effective resistance is given by the resistance of the field windings times the generator's slip and the effective resistance for the sub-synchronous current component is given by a sum of the rotor's resistance, the stator resistance and the effective resistance of the electricity grid, the effective resistance of the wind turbine generator may become negative for that current component in the case of a negative slip caused by the above-mentioned effect. Thus, the sub-synchronous current components may be amplified instead of being dampened under such conditions, which makes the SSR-event even more dangerous for wind turbine components, such as the wind turbine converter system.

The method of controlling a converter system comprises detecting the sub-synchronous resonance event. This detection is, for example, based on detecting oscillations of the power output of the wind turbine converter system at sub-synchronous frequencies or on detecting oscillation of generator-stator voltages and/or generator-stator currents at sub-synchronous frequencies.

In response to a detected sub-synchronous resonance event, a switch from a non-SSR control mode, typically corresponding to standard operation of a wind turbine, to an SSR-control mode is performed.

The SSR-control mode comprises at least one of (i) freezing rotor AC voltages in magnitude and phase, (ii) altering at least one rotor-current-controller gain, (iii) altering at least one rotor-current-controller time constant.

An example of a transient response of the converter system to the SSR-event would be an immediate and excessive increase or decrease of rotor AC voltages, due to an excess control action of a generator-side inverter controller.

To counteract such an excessive response of the converter system, for example, the rotor AC-voltages are frozen in magnitude and phase when performing the SSR-control mode.

Freezing the rotor AC voltages is, for example, achieved by a rotor-voltage controller of the DFIG wind turbine converter system, for example, arranged at the generator-side inverter controller. The rotor-voltage controller is, for example, an adaptive proportional-integral (PI) controller.

The term "adaptive" with respect to a controller is chosen herein to make clear that the control parameters of the controller addressed, such as the controller gain, are not fixed, but can be adapted during control operation.

The rotor-voltage controller is, for example, arranged to stop voltage-control operation upon detection of an SSR-event, for example, by setting the controller gain of the voltage controller substantially to zero.

Freezing the AC-voltages of the rotor in turn also freezes the rotor current flow in a state before the detection of the SSR-event. Hence, by freezing the AC-voltages one at least ensures that the influence of the SSR-event on the converter system is not amplified by an excessive response by the generator-side inverter (triggered by the grid-side inverter controller) to the SSR-current components present in the generator-stator circuit.

As mentioned above, the SSR-control mode comprises at least one of (i) freezing rotor AC voltages in magnitude and phase, (ii) altering at least one rotor-current-controller gain, (iii) altering at least one rotor-current-controller time constant.

Both the at least one rotor-current controller gain and the at least one rotor-current controller time constant are control parameters of the rotor-current controller.

Control parameters of the rotor-current controller are parameters that define the response of the rotor-current controller to deviations between a target value for rotor-currents and actual values of the rotor-currents. As the rotor-current controller is an adaptive controller, for example an adaptive proportional-integral (PI) controller, these control parameter can be changed during control operation.

The SSR-control mode is performed using the common rotor-current controller of the generator-side inverter. Hence, to perform the non-SSR control mode, there is no need to equip the wind turbine converter with further controllers arranged to carry out a damping of the SSR-event.

The rotor-current controller itself receives target values from superordinate controller(s), as for example an active power controller of the wind turbine or a torque controller of the wind turbine. The rotor-currents are set by the rotor-current controller such that a certain active power target value or a certain torque target value is reached.

However, in the case of a sub-synchronous resonance event, the actual rotor current is influenced by sub-synchronous magnetic fields in the stator-circuit causing magnetic flux and by corresponding current components in the rotor-circuit. Thereby, a measure of the difference between rotor-current targets and the actual rotor-current (error-signal), used as input for the rotor-current controller, changes rapidly because of this effect.

As the adjustments of the rotor-current controller, for example, follow these rapidly changing error signals, this may lead to a resonance interaction between the rotor-current controller action and the SSR-event, which leads to an amplification of the SSR-event and the impact of the SSR-event on wind turbine components. This effect is also known as sub-synchronous control interaction (SSCI). To overcome this control interaction at least one of (i) the rotor-current controller gain and (ii) the rotor-current controller time constant is altered when performing the SSR-control mode.

In some embodiments the SSR-control mode further comprises at least one of: (ii) performing the altering of the at least one rotor-current-controller gain by decreasing the at least one rotor-current-controller gain, and (iii) performing the altering of the at least one rotor-current-controller time constant by increasing the at least one rotor-current-controller time constant.

By decreasing the at least one rotor-current controller gain and increasing at least one rotor-current controller time constant, being control parameters that control the response (control action) of the rotor-current controller to differences between the rotor-current target and the actual rotor-current, it is ensured that excess rotor-current changes demanded by the rotor-current controller do not amplify the SSR-current components by making the resistance of the generator-system more negative with respect to the frequency associated with the sub-synchronous current components.

Decreasing, for example, at least one rotor-current controller gain, is effective to dampen the response of the converter system to the sub-synchronous resonance event.

The rotor-current controller gain is the gain of the difference between the rotor-current controller target value and the actual rotor-current (rotor-current error-signal) applied, for example, to obtain the control action of several controllers, such as proportional (P) controllers, proportional-integral (PI) controllers and proportional-integral-derivative (PID) controllers.

The lower the rotor-current controller gain becomes, the lower the control action will become. Hence the response of the controller to changes becomes more inert by decreasing the at least one rotor-current controller gain. The control-action of the rotor-current controller, corresponds for example to a voltage-target value or pulse-width modulation (PMW) target value to be achieved in order to minimize the rotor-current error signal.

In the exemplary case of a proportional rotor-current controller, a control action of the controller as a function of the error signal is, in time domain, given by:

$$u(t)=K_c*e(t)+u_0$$

wherein $u(t)$ is the control action, $K_c$ is the rotor-current controller gain, $e(t)$ is the rotor-current error-signal and $u_0$ is an offset value.

This controller gain "$K_c$" is, for example, decreased in order to prevent the above-mentioned sub-synchronous control interaction (SSCI), when using, for example, a proportional controller as the rotor-current controller. The part "$K_c*e(t)$" is further referred to herein as the proportional part of the controller.

As, for example, a small rotor-current controller gain value may affect the normal operation of the wind turbine, the wind turbine controller gain is only adjusted in the SSR-control mode but not set to a lower value from the beginning, i.e. also in the non-SSR control mode.

However, as a proportional-integral (PI) controller has besides the proportional part presented above also an integral part, that is further described below. The rotor-current controller gain, decreased during the transient SSR-activity of the SSR-control mode, is in this context, for example, either the gain of the proportional part, or the gain of the integral part.

If the rotor-current controller is provided with an equal gain for the proportional and integral part, hence, a rotor-current controller common gain "Kp", this is, for example, considered to be the rotor-current controller gain to be decreased in the non-SSR control mode.

The proportional part of a PI controller, in general, can be seen as a part taking into account present errors as it is proportional to the present error $e(t)$, the integral part of a PI controller takes into account time-averaged past errors by integrating past errors and dividing them by an integral time constant.

Same applies to rotor-current controllers realized as proportional-integral-derivative (PID) controllers and the gains of their respective proportional, integral and derivative parts. If the controller gain of a PID-controller is equal for all three parts, the rotor-current controller gain, to be adjusted in the SSR-control mode, is the rotor-current controller common gain "Kp".

The additional part of the PID controller, not present in the PI controller, namely the derivative part, takes into account linearly predicted future errors by multiplying the time-derivative of the error-signal with a derivative time constant.

As mentioned above, for example, decreasing the at least one rotor-current time constant, is also effective to dampen the response of the converter system to the sub-synchronous resonance event. In the SSR-control mode, the at least one rotor-current controller time constant and the at least one rotor-current controller gain are, for example, decreased at the same time to dampen the response of the converter system to the SSR event.

Increasing the at least one time constant of the rotor-current controller, when performing control action with that controller, has an influence on, e.g. a response time of the rotor-current controller, and hence also on the time needed to reach a target value.

When the rotor-current controller is realized as a proportional-integral controller, the integral part of the proportional-integral controller is weighted with the inverse of the controller integral time constant "$T_1$". This controller integral time constant, for example, is the controller time constant that is increased when the SSR-control mode is operated. Decreasing this controller integral time constant "$T_1$" thereby adapts the control action caused by the integral part of the rotor-current controller, when the rotor-current controller is, for example, realized as a proportional-integral controller or as a proportional-integral-derivative controller.

When the rotor-current controller is realized as a PID controller, there are two time constants, namely the integral time constant "$T_1$", weighting the integral part, and the derivative time constant "$T_D$", weighting the derivative part. To make a rotor-current controller, realized as PID controller, more inert with respect to changes of the rotor-current, for example the integral time constant is increased and the derivative time constant is decreased.

As mentioned above, the control parameter values of the SSR-control mode are not suitable for optimal power production in the non-SSR operation mode. Therefore, a switch back to control parameters associated with the non-SSR control mode is performed when the SSR-event has ended. This switch-back is performed in the course of a switch from the SSR-control mode to the non-SSR control mode.

The converter system registers the end of the SSR-event, for example, by monitoring power-output oscillation caused by the SSR-event, and assuming that the SSR-event has ended when power-output oscillation no longer occurs within a given period of time. Another possibility to register the end of the SSR-event is to use the same or a similar mechanism used to initially detect the SSR-event, as further described below.

When the end of the SSR-event is registered, a switch is performed from the SSR-control mode to the non-SSR control mode.

In some embodiments, the SSR-control mode comprises a transient SSR-control activity and a non-transient SSR-control activity, wherein the transient-SSR control activity comprises freezing rotor AC voltages in magnitude and phase, and a switch from the transient SSR-control activity to the non-transient SSR-control activity is performed after a given time, wherein the non-transient SSR-control activity comprises least one of (i) decreasing at least one rotor-current-controller gain and (ii) increasing at least one rotor-current-controller time constant.

The SSR-control mode comprises at least one of the following activities, namely (i) a transient SSR-control activity and (ii) a non-transient SSR activity. First, the transient SSR-activity will be explained by the examples provided below.

The transient SSR-control activity is, for example, effective to dampen a transient response of the converter system to the sub-synchronous resonance event by freezing rotor AC voltages upon detection of the SSR-event.

The transient SSR-control mode is performed for a given timespan that is, for example, predetermined or dependent on momentary control and/or operation parameters of the wind turbine.

The transient SSR-control activity, comprising freezing the rotor AC voltages in magnitude and phase, is performed for a given period of time upon detecting the SSR-event, in order to mitigate an excessive transient response of the converter system (initiated, for example, by an excessive response of the rotor-current controller to the SSR-event).

The continuation of power-production adapted to wind speed, angle of attack, etc. by the wind turbine is nearly impossible when rotor AC voltages are frozen as a part of the non-transient SSR-control activity. However, this control activity prevents damage to the wind turbine due to an excessive transient response to the SSR-event by the converter system, triggered by an excessive control action of, for example, the generator-side inverter controller.

A switch to the non-transient SSR-control activity is performed, so as to withstand the SSR-event by at least one of (i) decreasing the at least one rotor-current-controller gain and (ii) increasing the at least one rotor-current controller time constant, but however, enable the wind turbine to produce output power and at least being able to adapt wind turbine operation in a certain, however impaired, range to wind speed, grid-demand, etc.

In some embodiments, the sub-synchronous resonance event is detected by filtering wind turbine generator stator-currents or stator-voltage to detect sub-synchronous components of said stator currents or said stator-voltage. As the sub-synchronous resonance event is, in fact, caused by sub-synchronous resonance current and voltage components being present in the series-compensated power-transmission line, these current and voltage components are an effective indicator of the occurrence of an SSR-event. The sub-synchronous current components have a frequency that is below the synchronous frequency, e.g. 50 Hz. The frequency of that sub-synchronous current or voltage component lies therefore, for example, within a range from 15 to 45 Hz.

There are several possible ways of filtering the stator currents or stator voltages in order to detect sub-synchronous stator current or voltage components.

In some embodiments, the wind turbine generator stator-currents and/or stator-voltages are filtered by a band-pass filter, responsive to a frequency band of 15 to 45 Hz.

Hence, if any current or voltage components greater than a threshold-magnitude of, e.g. 50 A, pass such a band-pass filter and are detected by a current or voltage measurement device downstream of the band-pass filter, the transient SSR mode is initiated. Different band-pass filters may be provided for each phase winding of the generator-stator windings or one band-pass filter may be provided for the whole generator-stator windings.

Alternatively, the SSR-event is detected by monitoring power-output oscillations at the SSR-frequency by detecting repeated deviations of power-output measurements at the grid-coupling point of the wind turbine from a power-output reference value that oscillate at the SSR-frequency.

In some embodiments the transient SSR-control activity comprises an active damping of the SSR-event by injecting of active and/or reactive power in antiphase to a sub-synchronous resonance oscillation into the electricity-grid by a grid-side inverter of the converter system.

At least one of active power or reactive power is injected into the grid in antiphase to the SSR-oscillation present in the grid and thereby also in the stator-circuit of the DFIG wind turbine generator. A grid-side inverter controller for example, injects active/reactive power of a magnitude, frequency and phase such as to cancel out sub-synchronous current components or sub-synchronous voltage components from the grid. To provide an example, reactive power is injected so as to inject voltage into the grid at the same frequency as SSR-voltage components, but this injected power is phase-shifted by a half-period, such that the injected voltage components and the SSR voltage components cancel each other out. The sub-synchronous frequency at which the voltage is injected is, for example, obtained by several band-pass filters used to initially detect the SSR-event.

Thereby, the SSR current components in the grid and also in the stator circuit are actively dampened. The active/reactive power is injected into the grid by the grid-side inverter that in turn receives energy for this injection from storage elements within a DC-link of the DFIG converter system. To provide this energy, the generator-side inverter, coupled to the rotor might even draw energy from the rotor-circuit over the generator-side inverter in order to supply the grid-side inverter with enough energy to carry out this grid-side active/reactive power injection for at least for the duration of the transient SSR-control mode.

In some embodiments, the active damping of the SSR-event by the grid-side inverter of the converter system and freezing rotor AC-voltages by the generator-side inverter are performed substantially simultaneously.

By combining the freezing of rotor AC voltages by the generator-side inverter and actively dampen the SSR-event by the grid-side inverter, as described above, the transient response of the converter system to the present SSR-event is minimized, when the transient SSR activity is performed as the first activity of the SSR-control mode, subsequent to the detection of the SSR-event.

In some embodiments, decreasing the rotor-current-controller gain comprises decreasing the rotor-current controller common gain. If, for example, the rotor-current controller common gain was set to a value of 1.0 in the non-SSR operation mode, it is decreased to a value of 0.25 in the non-transient SSR control mode. Hence, applying these values to an example of a proportional rotor-current controller, the proportional controller in this example having a zero offset value, the control action in a control cycle equals the error-signal in the non-SSR control mode, and is a quarter of the error-signal in the non-transient SSR control mode, when defining a control cycle, in this example, as applying one control action at a time.

Thereby, provided that the target value is stable throughout at least four successive control cycles, in the non-transient SSR control mode, four control cycles—in which a control signal corresponding to the control action is applied—are necessary to make the actual rotor-current and the rotor-current target value match, as the rotor-current controller only demands the correction of a quarter of the error in each control cycle. In the non-SSR operation control mode, only one such control cycle was needed to achieve a match between actual value and target value for the rotor-current controller.

By decreasing the rotor-current controller common gain, the above-described resonance between the controller behavior and the SSR-event (SSCI) is dampened, as the control action of the rotor-current controller is reduced. The rotor-current controller still follows target values for the rotor current provided by superordinate controllers but, however, changes the rotor-currents smoothly such that these smooth changes do not become resonant with changes of the actual rotor current and thereby the error-signal input to the controller due to the SSR-event.

In the example of a rotor-current controller that is realized as a proportional (P) controller, the contribution of the proportional part (the only part of the controller) to the control action is reduced. In the example of a rotor-current controller that is realized as a proportional-integral (PI) controller, as mentioned above, the decreasing rotor-current common gain "Kp" reduces also the contribution of the integral part to the control action of the controller and thereby the contribution of past error signals to the control action.

The same applies for the different parts (proportional part, integral part, derivative part) of a PID controller. When a common gain of a PID controller is reduced, the contribution of the derivative part to the control action is also reduced, thereby reducing the contribution of linearly interpolated future errors to the control action.

In some embodiments, increasing the at-least-one rotor-current controller time constant comprises increasing a rotor-current controller integral time constant.

By increasing, the rotor-current controller integral time constant, the integrated part of a rotor-current controller realized as PI controller or PID controller becomes smaller. Hence, the influence of past errors on the control action decreases for such a rotor-current controller.

Thereby, the rotor-current control system is more inert with respect to rotor-current changes, caused by the SSR-event, as previous error-signals caused by the SSR-event do not further increase the control action.

Compared to the control operation without an increased integral time constant, the response time of the rotor current controller, hence, the time to reach a target value, is also decreased. This also makes the PI controller more inert with respect to rotor-current changes and in turn reduces the SSCI effect, as the rotor-current controller does not follow the SSR-induced rotor-current changes to the same extent as when the rotor-current controller was provided with a rotor-current controller time constant of the non-SSR control mode.

In some embodiments, the SSR-control mode comprises decreasing the at least one rotor-current controller common gain and increasing the at least one rotor-current controller time constant.

The rotor-current controller common gain is for example decreased, while the rotor-current controller integral time constant is increased. Thereby, the above-described effects of decreasing the rotor-current controller common gain and increasing the time constant of the rotor-current controller are combined.

By combining these two measures, the rotor-current controller demands changes of the rotor-current that are small compared to changes demanded by that controller in the non-SSR control mode. To provide an example for the effect of this combination, the influence of integrated past error-signals on the control action is decreased by increasing the rotor-current controller integral time constant and the entire control action is decreased by decreasing the rotor-current controller common gain.

Hence, the rotor-current controller becomes even more inert to changes of the rotor-current induced by the SSR-event than when applying only one of these two measures.

In some embodiments the rotor-current controller is a proportional-integral controller.

For a rotor-current controller, realized as a proportional-integral controller, the control action is obtained as a function of the error signal in the time domain by the following formula:

$$u(t) = K_P \left( e(t) + \frac{1}{T_I} \int_0^\tau e(t) \, dt \right),$$

wherein "u(t)" is the control action, "Kp" is the rotor-current controller common gain, e(t) is the rotor-current error-signal and "$T_1$" is the rotor-current controller integral time constant.

The term "$K_p e(t)$" is the proportional part of the proportional-integral controller, whereas the term $$"\frac{K_p}{T_I} \int_0^\tau e(t) \, dt"$$

is the integral part of the proportional-integral controller, mentioned above.

The formula given above shows that the control action u(t) is effectively decreased by increasing the controller integral time constant $T_1$ and/or decreasing the rotor-current controller common gain "Kp".

In some embodiments, at least one of the rotor-current-controller gain and the rotor-current-controller time constant is changed to at least one predetermined value effective to dampen the effect of a sub-synchronous resonance event on the wind turbine that is responsive to a predetermined series-compensation level of a power-transmission line.

The control parameters of the rotor current controller addressed, namely at least one of (i) the at least one rotor current controller gain and (ii) the at least one rotor current controller time constant are, for example, effective to dampen an SSR-event linked to a series compensation level of 50%. The at least one rotor-current controller gain is decreased in this example and the at least one rotor current controller time constant is increased in this example at the same time, to be effective to mitigate this severe SSR-event. Such a severe SSR-event would, for example, be hardly tolerated by the wind turbine's electronic components without suffering damage. "Effective to dampen the SSR-event" is defined herein as to be sufficient to stop power-output oscillations of the wind turbine caused by the SSR-event.

By switching these control parameters to values that correspond to such a severe SSR-event, in the course of the non-transient SSR-control activity, it is ensured that the damping of the response of the converter system to an SSR-event is at least sufficient for the SSR-event (corresponding to a lower series compensation level) actually present.

However, a change of these control parameters in this SSR-control mode also impairs the overall power production performance of the wind turbine, as a change to at least one control-loop parameter that corresponds to such a severe SSR-event effectively paralyzes the wind turbine converter systems ability to react to changes of wind-speed, etc. in an optimal manner. Therefore, this change, for example, only serves as the basis for further adaptions of the control-loop parameters in the non-transient SSR-control mode.

The values of the at least one rotor current controller gain and/or the at least one rotor-current controller time constant, effective to dampen the effect of the SSR-event responsive to a predetermined series compensation level, is, for example, obtained by computer-simulations of the behavior of the wind turbine, for example, also in connection with a wind park, connected to a power-transmission line of such a series-compensation level.

In some embodiments, at least one of the rotor-current-controller gain and the rotor-current-controller time constant is adjusted from the at least one predetermined value effective to dampen the predetermined series-compensation level towards at least one value of the non-SSR operation control mode.

Taking the value(s) of at least one of the rotor-current controller time constant and the rotor current controller gain, effective to dampen the above-mentioned severe SSR-event, such as a rotor current controller common gain "Kp" of 0.25 and a rotor-current controller integral time constant of 1.5 s, as a basis, this at least one control parameter of the rotor current controller is adjusted towards value(s) that would be applied if the SSR-event was not present, i.e. parameter values of the non-SSR control mode.

The magnitude of the change of these control parameter(s) of the rotor-current current controller, effective to dampen the severe SSR-event, towards the at least one control parameter value of the non-SSR control mode is, for example, determined on the basis of power-output oscillations induced by the SSR-event.

The power-output of the wind turbine is, for example, continuously monitored, in order to detect power-output oscillations at the SSR frequency, caused by the SSR-event. At least one of (i) the at least one rotor current controller gain and (ii) the at least one rotor current controller time constant is, for example, changed towards at least one control parameter of the non-SSR operation mode in an iterative manner, until a power-output oscillation at the SSR-frequency is detected. These control parameters are, for example, subsequently fixed at values that differ only by the change of one iteration step to the values at which these oscillations occur, but, however, just do not show such a power-output oscillation.

By iteratively changing the at least one control parameter of the rotor-current controller to control parameter values corresponding to a severe SSR-event and back again, these control parameters are, for example, as described above, held in a parameter range that is sufficient to dampen the effect of the SSR-event on the wind turbine, but however, the ability of the converter system to adapt to changes of wind speed, angle of attack etc., is only minimally impaired.

In some embodiments the SSR-control mode comprises determining on the basis of measured power-output values, whether an SSR-event is critical for further operation of the wind turbine and shutting down the wind turbine when the SSR-event is determined to be critical for further operation of the wind turbine.

Despite of the application of the above-described damping measures, the effect of the SSR-event on the wind turbine can still be determined to be critical to further operation of the wind turbine, on the basis of the power-output values. The power-output values are, for example, used to calculate a representative indicative of an SSR-induced power-oscillation that is critical for further operation of the wind turbine. Such a representative is, for example, a counter of power-output values that counts the power-output values that exceed a given power-output value within a given timespan. If this counter, for example, exceeds a given admissible number of exceeding power output values, the wind turbine is shut down.

When shutting down the wind turbine converter system, power that is still produced by the wind turbine generator but not converted into fixed frequency AC current anymore may be guided to power dissipation units, such as high Ohmic, e.g. 100 MΩ resistive elements with high thermal capacity to prevent excessive current flow over the converter system when it is being shut down.

Additionally the wind turbines rotor blades may be pitched out of the wind and active braking of the wind turbine generator may be performed, when shutting down the converter system, to reduce the wind turbine generators power production.

According to a second aspect, a wind turbine converter system is provided, arranged to control a doubly fed induction generator—(DFIG) wind turbine converter system in the case of a sub-synchronous resonance event acts on the wind turbine. The converter system is arranged to detect a sub-synchronous resonance event. The sub-synchronous resonance event, is for example, detected by band-pass filters responsive to a frequency range from 15 to 45 Hz, arranged at grid-side terminals of the converter system. The converter system is further arranged to switch from a non-SSR-control mode to a SSR-control mode, in response to the detection of the sub-synchronous resonance event, wherein the SSR-control mode comprises at least one of:
 (i) freezing rotor AC voltages in magnitude and phase
 (ii) altering at least one rotor-current-controller gain, and
 (iii) altering at least one rotor-current-controller time constant.

The converter system is thereby in particular arranged to carry out the method according to the first aspect as well as various embodiments of this method, as described above.

BRIEF DESCRIPTION OF THE DRAWINGS

Exemplary embodiments of the invention are now described, also with reference to the accompanying drawings, wherein FIG. 1 schematically illustrates a wind turbine equipped with the converter system shown in more detail in FIG. 2.

The drawings and the description of the drawings are of examples of the invention and are not of the invention itself. Like reference signs refer to like elements throughout the following description of embodiments.

DESCRIPTION OF EMBODIMENTS

Figure 1:
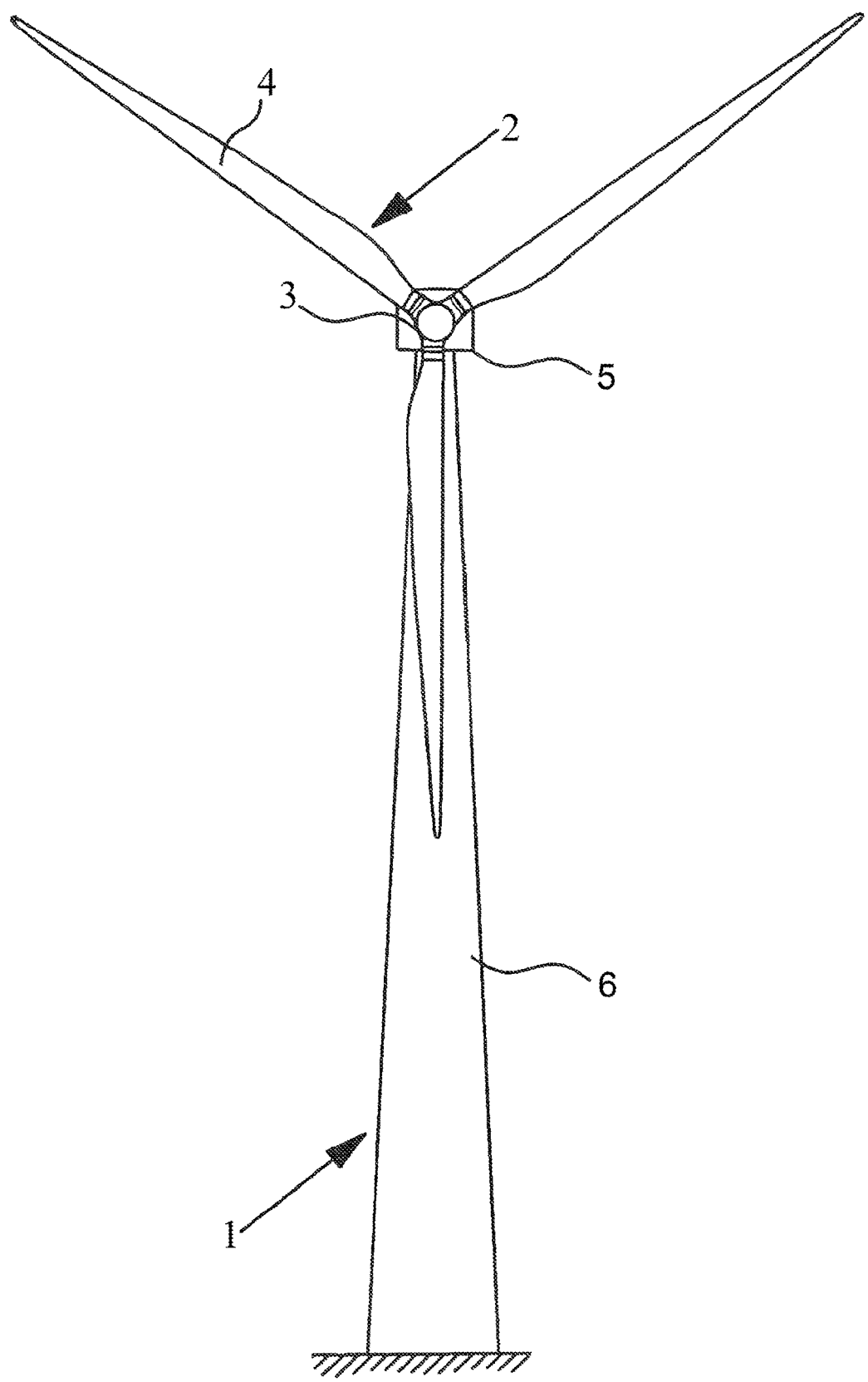

A wind turbine 1, shown in FIG. 1 is equipped with a nacelle 5, mounted atop a tower 6. A wind turbine rotor 2, driving a DFIG wind turbine generator 10 (not shown) that has three rotor-blades 4 mounted on a hub 3.

Figure 2:
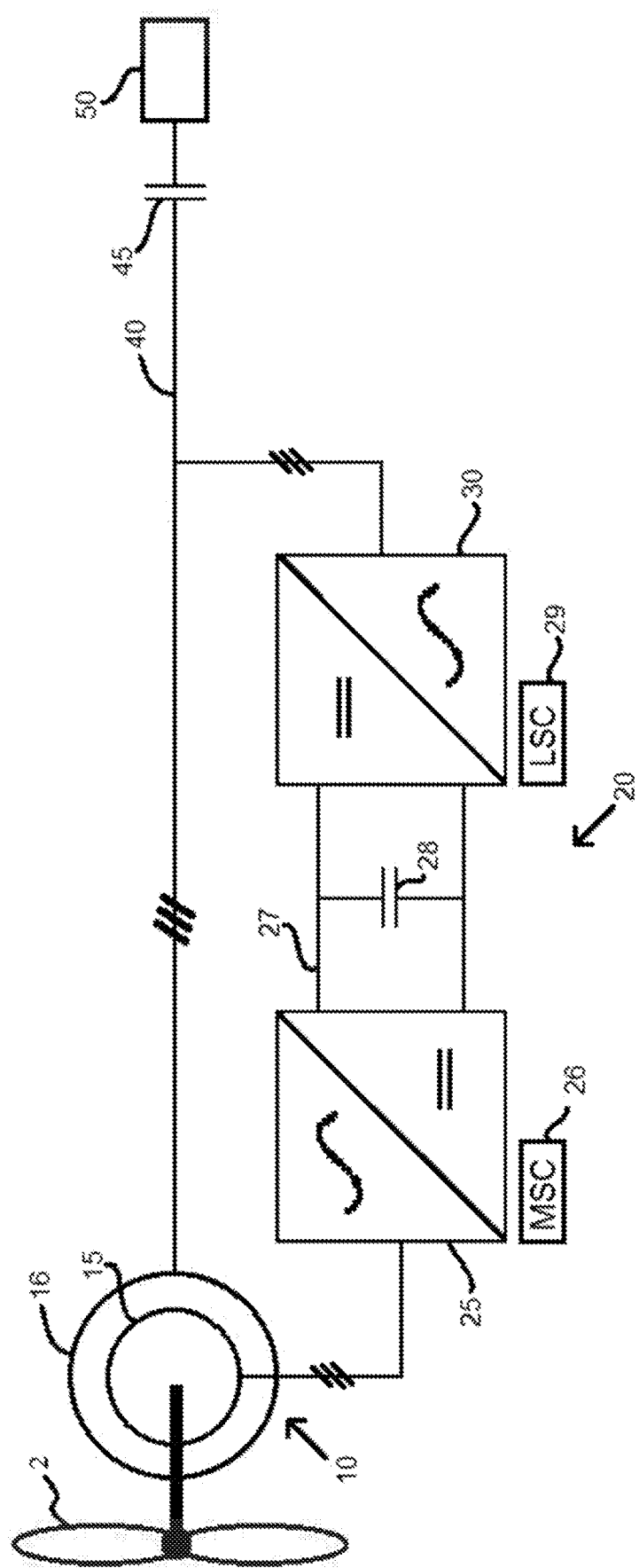
FIG. 2 is a schematic circuit diagram of a DFIG wind turbine generator connected to a series compensated power-transmission line, FIG. 3 schematically illustrates a wind park connected to a series compensated power-transmission line.

A wind turbine generator 10, coupled to an electricity grid 50 is schematically illustrated in FIG. 2. A rotor 15 of the wind turbine generator is driven by a rotor 2. The rotor 15 is coupled to a converter 20. The machine side inverter 25 of the converter 20 sets rotor-voltages and rotor-currents and thereby induces a magnetic flux in the rotor 15 that may rotate faster than, or slower than, the rotor 2, depending on current wind speed and currently demanded power production. The generator-side inverter 25 is, in turn, controlled by the generator-side inverter controller 26. The generator-side inverter 26 controller is controlled by a rotor-current controller that is a part of the generator-side inverter controller 26. The generator-side inverter 25 is connected to a grid-side inverter 30 by a DC link 27, which is equipped with a capacitor 28 as an energy storage element. The grid-side inverter 30, however, receives branched off three-phase currents that are used to feed the rotor 10 via the converter system 20. The grid-side inverter 30 is controlled by a grid-side converter controller 29. The generator-stator 16, in turn, is connected directly to the grid 50, via a series-compensated power-transmission line 40. The series compensation is given by a capacitor 45 connected in series to the power power-transmission line 40. The rotor 15 induces fixed-frequency, e.g. 50 Hz, AC currents in the generator stator 16, to produce power (the currents in the rotor are set by the converter-system 20 such that the fixed, frequency current in the stator is reached).

Figure 3:
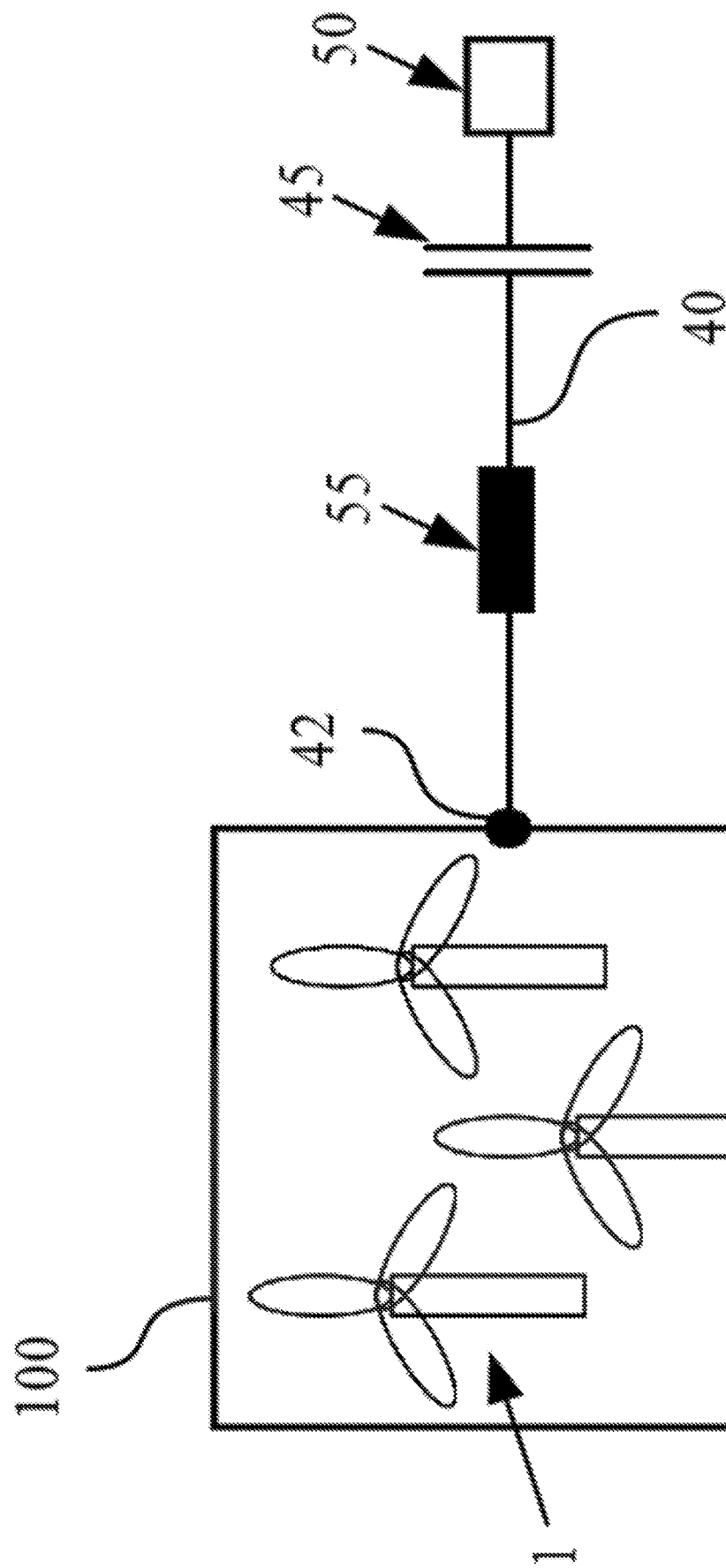

A wind park 100, formed of several wind turbines 1 and its connection to an electricity grid 50 is shown in FIG. 3. The wind turbines 1 of the wind park 100 are each connected to a point of common coupling 42, at which the wind park 100 is connected to the electricity-grid 50. The wind park feeds power to the grid via a series-compensated power power-transmission line 40. The series compensation is achieved by connecting a capacitor 45 in series to the power power-transmission line 40, the inductivity 55 of which is schematically illustrated by inductance 55. An SSR-event occurring due to the series compensation of power line 40, may spread through the point of common coupling 42 to the wind park 100, and thereby affect several wind turbines of the wind park 100, which may cause massive damage to those wind turbines 1. To prevent such a consequence, the effect the SSR-event on the wind turbine is dampened by performing the methods further illustrated by the block diagrams of FIG. 6.

Figure 4:
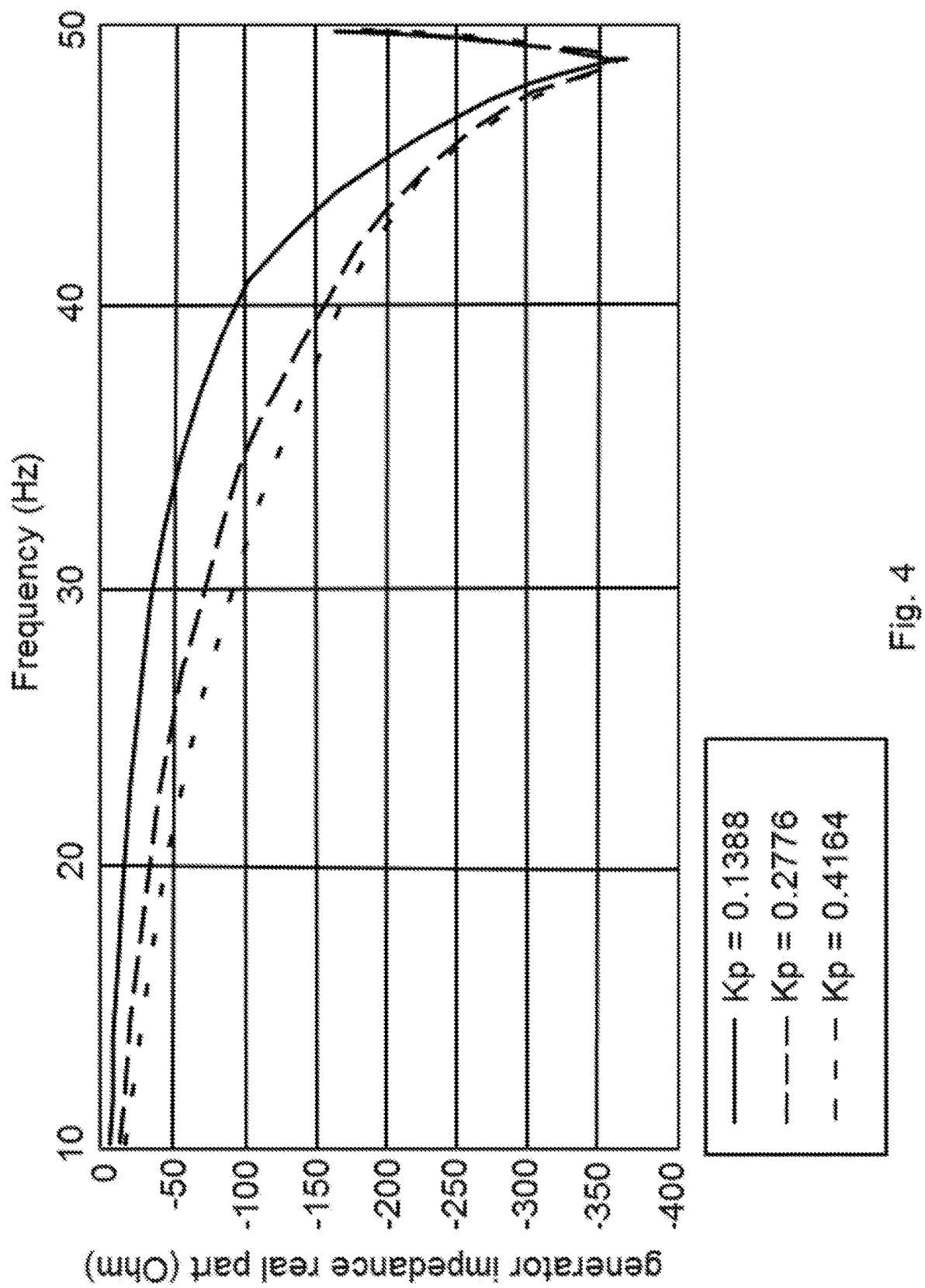
FIG. 4 is a diagram that shows the impact of the rotor-current controller common gain "Kp" on the wind turbine generator's impedance real part in the range of 10 to 50 Hz.

The influence of the rotor-current controller common gain "Kp" on the real part of the wind turbine generator's impedance, in a frequency range from 10 to 50 Hz is illustrated by FIG. 4. The short-stroke dashed line corresponds to a controller gain "Kp" of 0.4164, whereas the long-stroke dashed line corresponds to a controller gain "Kp" of 0.2776 and the continuous line corresponds to a rotor-current controller common gain of 0.1388. As can be seen from FIG. 4, the wind turbine generator's impedance real part reaches less negative values for lower rotor-current controller common gain values "Kp". The more negative the generator impedance real part becomes at a certain (sub-synchronous) frequency, the more the current components at this certain (sub-synchronous) frequency are amplified. Hence a less negative generator impedance real part stands for a higher damping of those current components instead of further amplification of these current-components and thereby further amplification of the influence of the SSR-event on the DFIG generator wind turbine. Hence, lowering the rotor-current controller common gain "Kp" dampens the effect of the SSR-event on the wind turbine converter generator and converter system.

Figure 5:
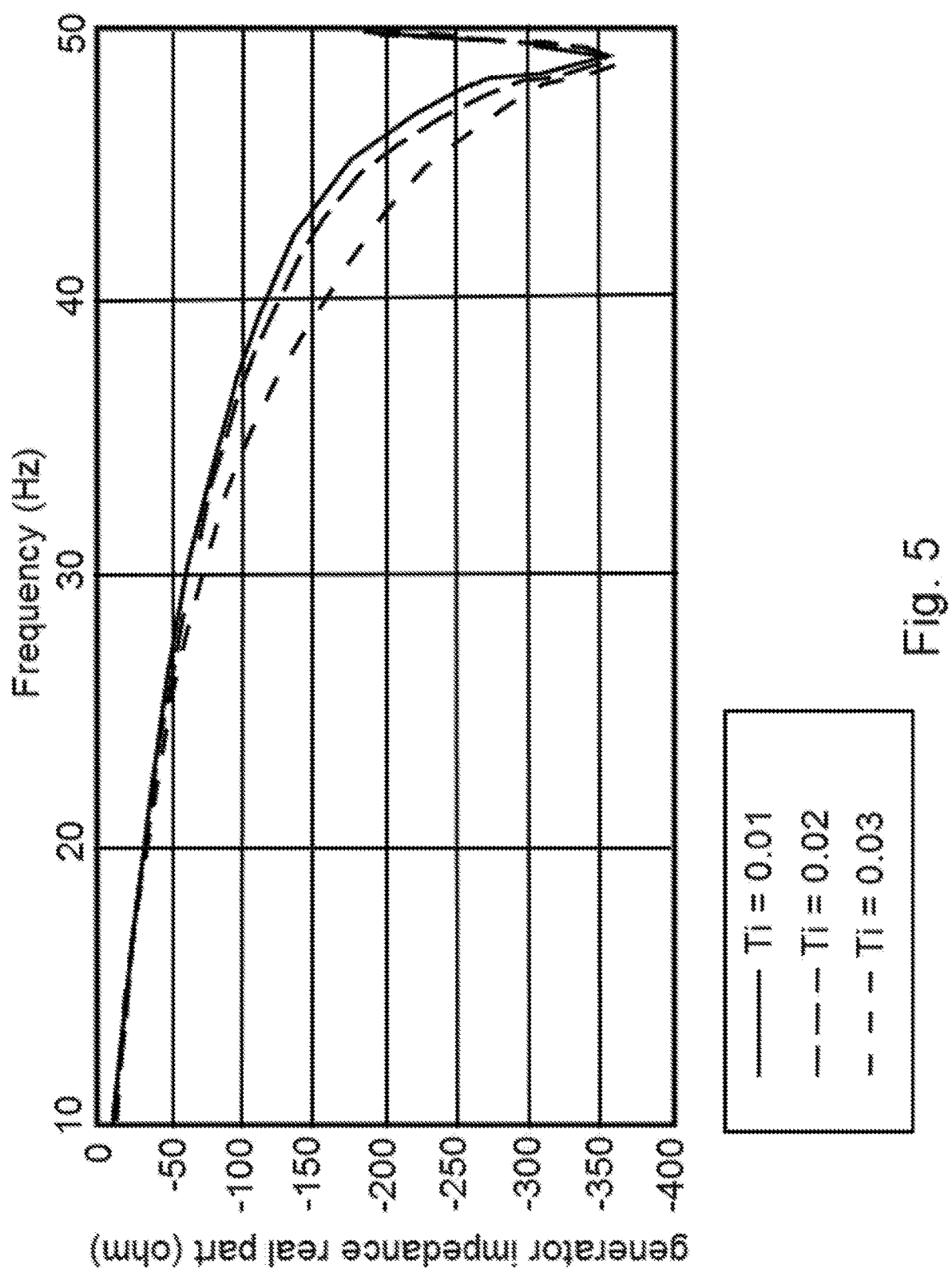
FIG. 5 is a diagram that shows the impact of the rotor current controller's integral time constant $T_1$ on the wind turbine generator's impedance real part in the range of 10 to 50 Hz.

The influence of the integral time constant "$T_1$" of the rotor-current controller on the real part of the wind turbine generator's impedance, in a frequency range from 10 to 50 Hz is illustrated by FIG. 5. As can be seen from this diagram, which is similarly set up to the diagram of FIG. 4, the real part of the generator-impedance becomes less negative with lower time constants "$T_1$". Thereby, the effect of an SSR-event on the wind turbine converter system is reduced by reducing the rotor-current controller integral time constant.

Figure 6:
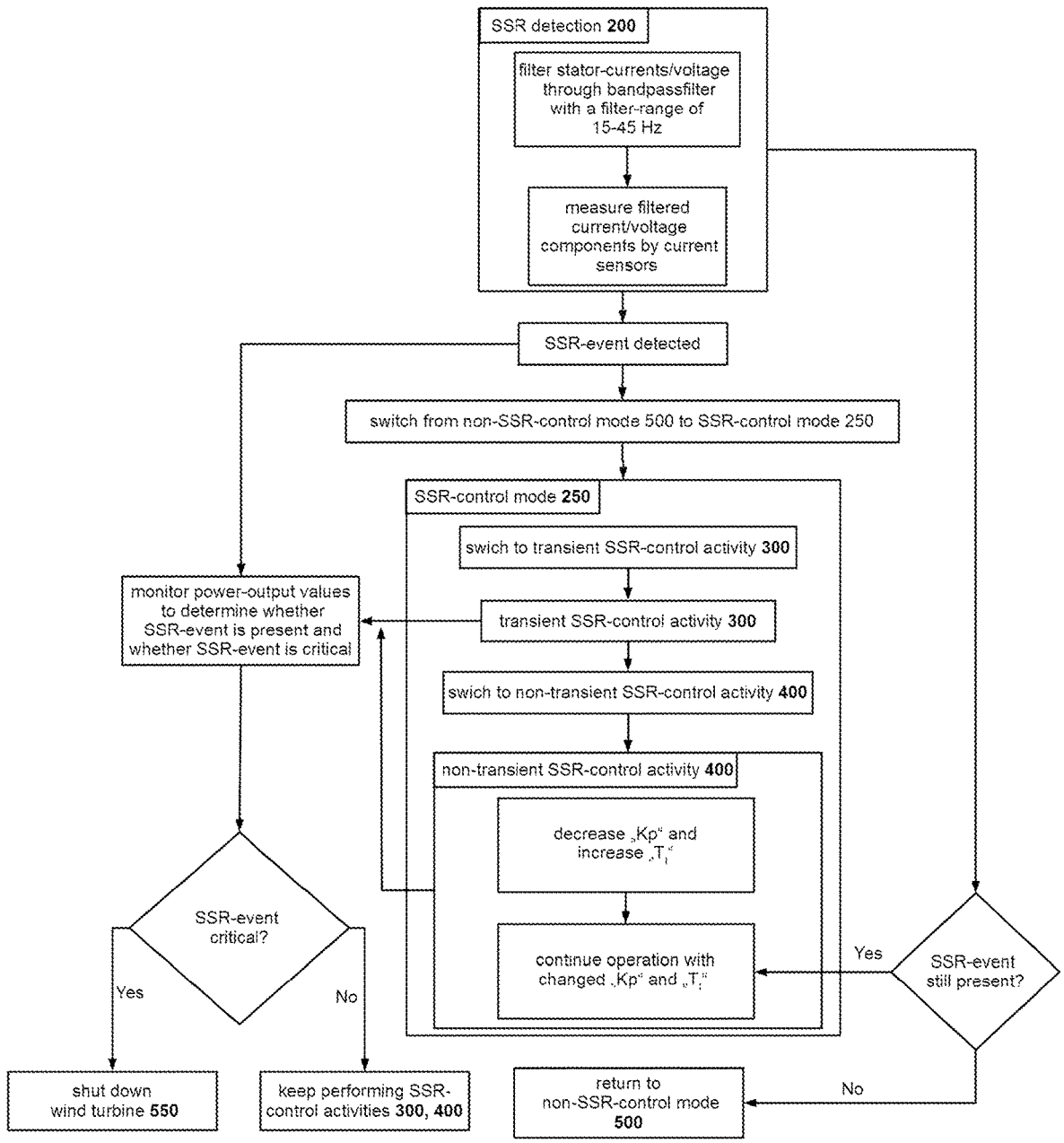
FIG. 6 is a block diagram of the method of controlling the DFIG wind turbine generator in the case of a detected SSR event.

An exemplary method of operating a wind turbine converter system in the case of a sub-synchronous resonance event acting on the wind turbine converter system, is illustrated by the block-diagram of FIG. 6. In an SSR-detection activity 200, the generator-stator currents or stator-voltage are filtered through a band-pass filter active in a range from 15 to 45 Hz. The stator-currents/voltage that pass though the band-pass filter are measured, by a current or voltage sensor. If the amount of current or voltage passing though the band-pass filter that is measured by that current or voltage sensors, exceeds a given threshold, the current grid-condition is classified as an SSR-event, i.e. an SSR-event has been detected. The detection of the SSR-event triggers a continuous monitoring of power-output values to obtain whether the SSR-event is still present and to ascertain whether the SSR-event is critical for further operation of the wind turbine. If the monitoring of the power-output values reveals that the SSR-event is, despite damping, critical for further operation of the wind turbine, the wind turbine is shut down in an activity 550. The shutdown 550, however, is only the last line of defense that will be applied if the methods described below fail to dampen the impact of the SSR-event on the wind turbine.

To prevent this shutdown 550 upon detection of the SSR-event, a switch is performed from a non-SSR control mode 500 to an SSR-control mode 250. More specifically, the switch performed is a switch to a transient-SSR control activity 300. This transient SSR-control activity 300 is further described in conjunction with FIG. 7. After the transient-SSR control activity 300 has been performed, for a given period of time, a switch to the non-transient SSR-control activity 400 is made. In the course of the non-transient SSR-control activity 400, the rotor-current controller common gain is decreased and the rotor-current controller integral time constant is increased. An exemplary variant of the non-transient SSR-control activity 400 is schematically illustrated by FIG. 8.

Upon detection of the SSR event in activity 200, monitoring is carried out to determine whether the SSR-event is still present or not. As long as the SSR-event is present, the wind turbine converter system is operated with the at least one control parameter of the rotor current controller that resulted from the change of control parameters during the non-transient SSR-control activity 400. When the SSR-detection 200 no longer detects sub-synchronous generator-stator current-components for a given period of time, this serves as an indication that the SSR-event has ended. Thereupon, the method returns to non-SSR control mode 500. In non-SSR operation control mode 500, the at least one control parameter of the rotor-current controller are changed back to the value held by the control parameter of the rotor-current controller before the SSR-control mode 250 was entered.

Figure 7:
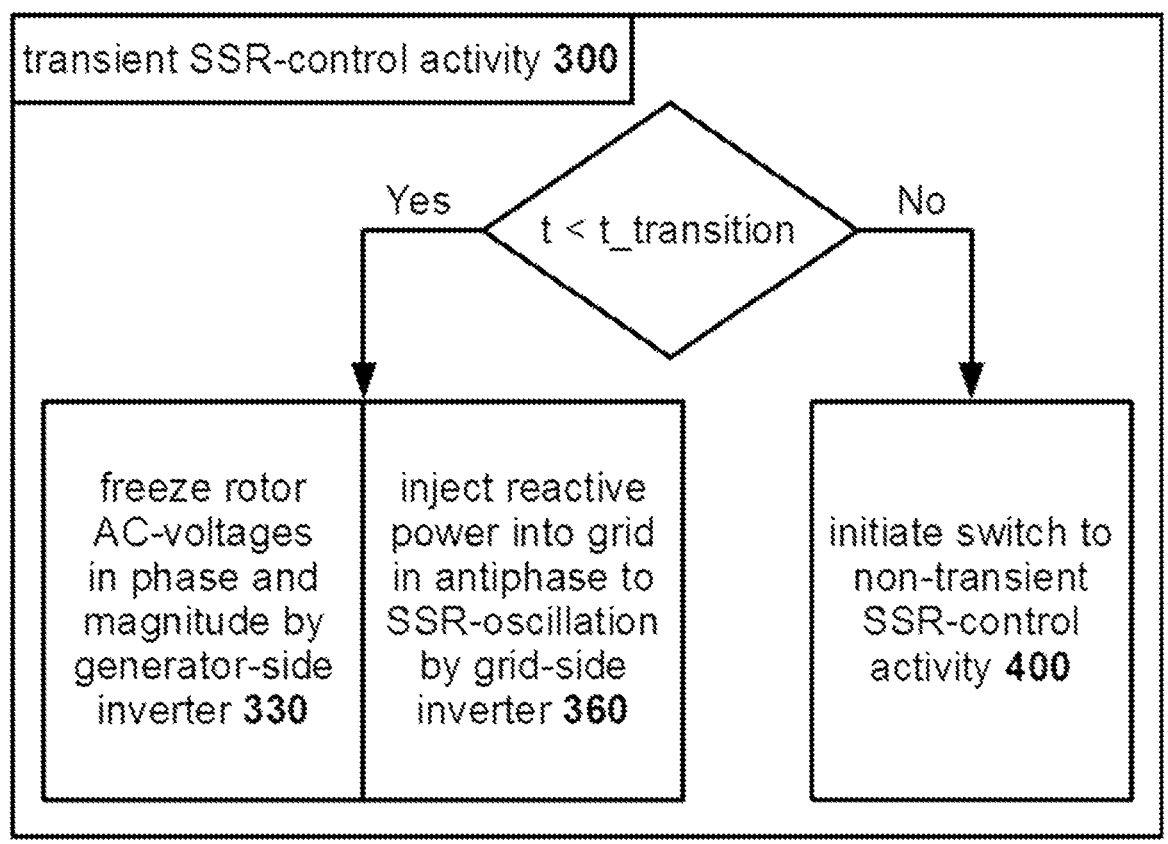
FIG. 7 is a block diagram further illustrating the transient SSR-control activity of the SSR-control mode illustrated by FIG. 6.
Figure 8:
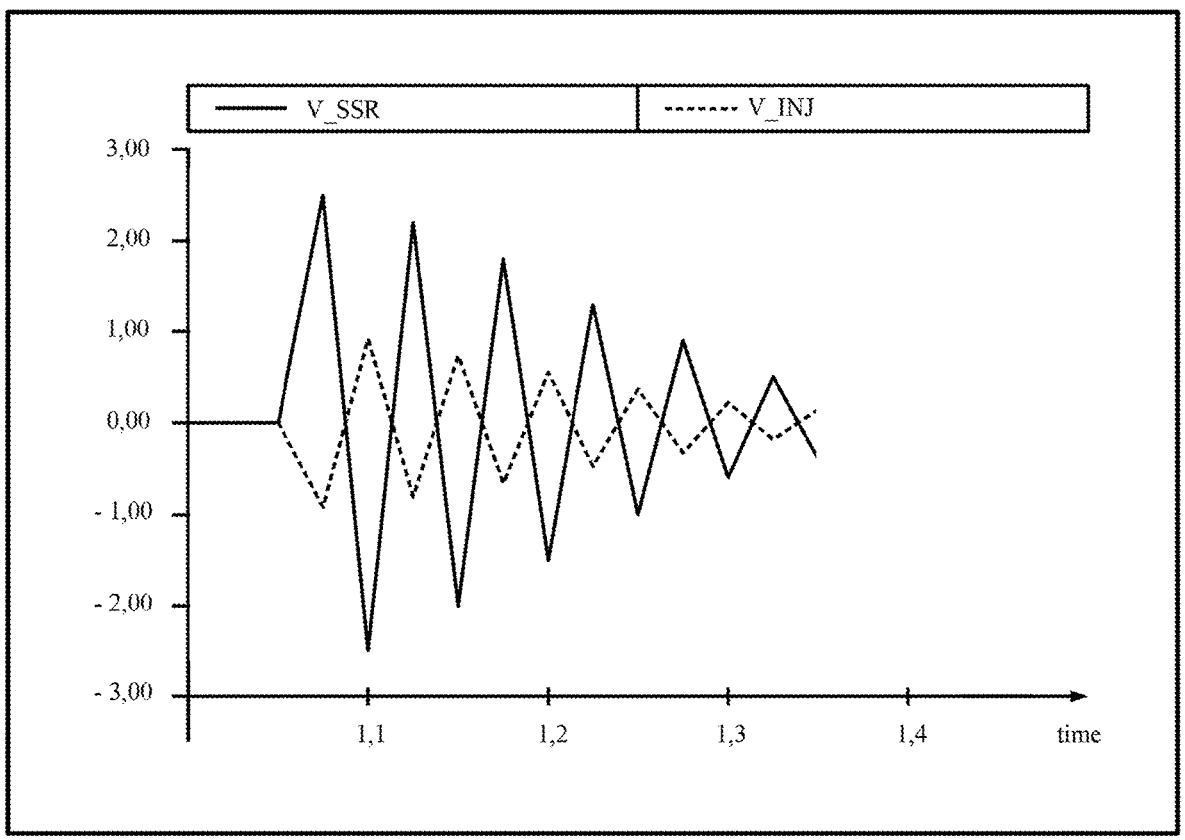
FIG. 8 is a diagram further illustrating the injection of reactive power into the grid to dampen an SSR-event during the transient SSR-control activity of the SSR-control mode illustrated by FIG. 6.

The transient SSR-control mode, which is part of the exemplary method illustrated by FIG. 6, is schematically illustrated by the block diagram shown in FIG. 7.

When the SSR-event is detected, a switch is performed to the transient SSR-control activity 300. The transient SSR-control activity 300 is performed in order to prevent an excessive response of the converter-system to the SSR-event upon its occurrence. The transient SSR-control activity 300 is performed for a given period of time. As long as the time elapsed since the transient SSR activity 300 was entered is less than the given duration of this transient SSR-control activity 300, the following activities with reference signs 330 and 360 are performed substantially at the same time:

In activity 330, the rotor AC-voltages are briefly frozen in magnitude and phase by the generator-side inverter. This prevents an excessive reaction of the rotor control-circuit to the SSR-event. In activity 360, the grid-side inverter of converter-system injects reactive power in antiphase to the SSR-current components into the grid, so as to increase and decrease grid-voltage in the vicinity of the wind turbine's grid connection point, such that SSR voltage components are cancelled out, to thereby dampen SSR current-components.

When the given time for the transient SSR-control mode to operate has elapsed, a switch to the non-transient SSR control mode 400 is initiated.

The diagram of FIG. 8 shows the injection of reactive power, so as to inject voltage V_INJ into the grid that is in antiphase to the SSR-voltages V_SSR. As can be seen from FIG. 8, the SSR voltages are dampened as a result of this reactive power injection by the grid side inverter.

Figure 9:
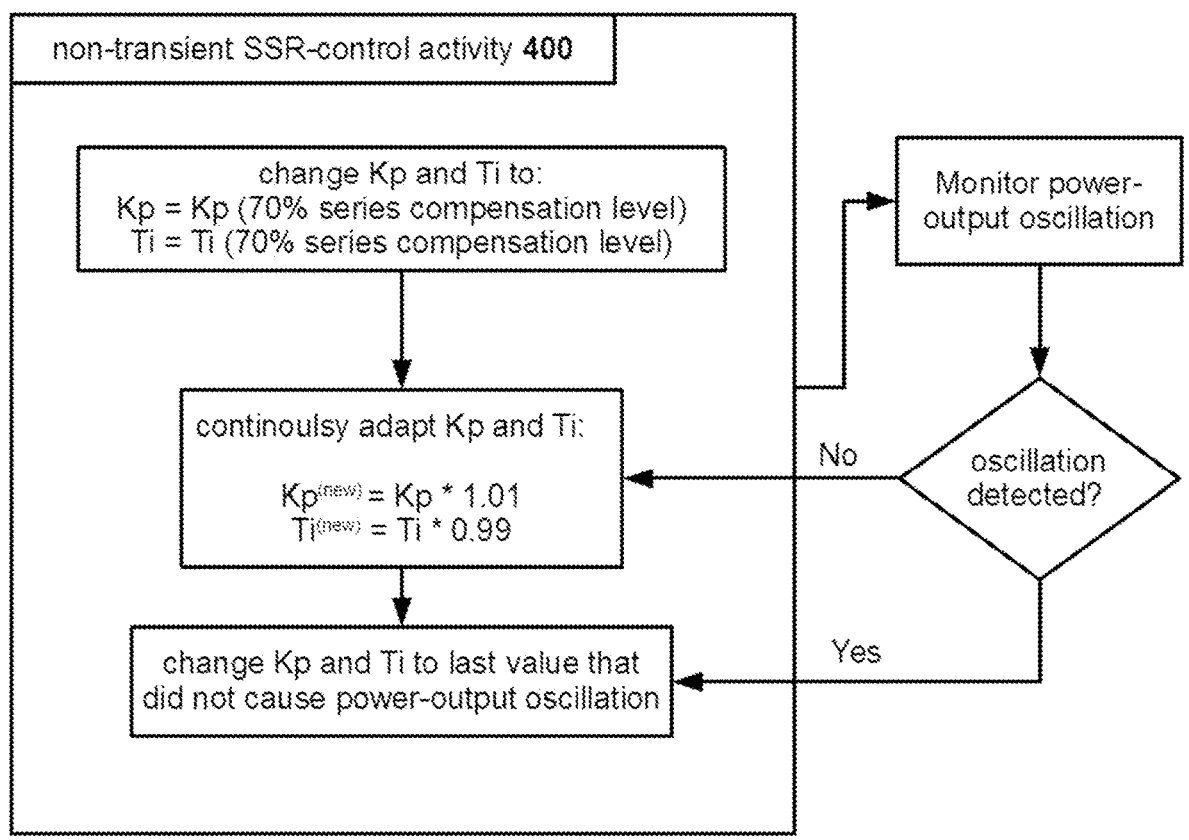
FIG. 9 is a block diagram further illustrating the exemplary non-transient SSR-control activity of FIG. 6, wherein predetermined control-loop parameters "Kp" and "$T_1$", corresponding to a predetermined severe SSR-event, are taken as the basis of control-loop parameter adjustment in the non-transient SSR-control activity.
Figure 10:
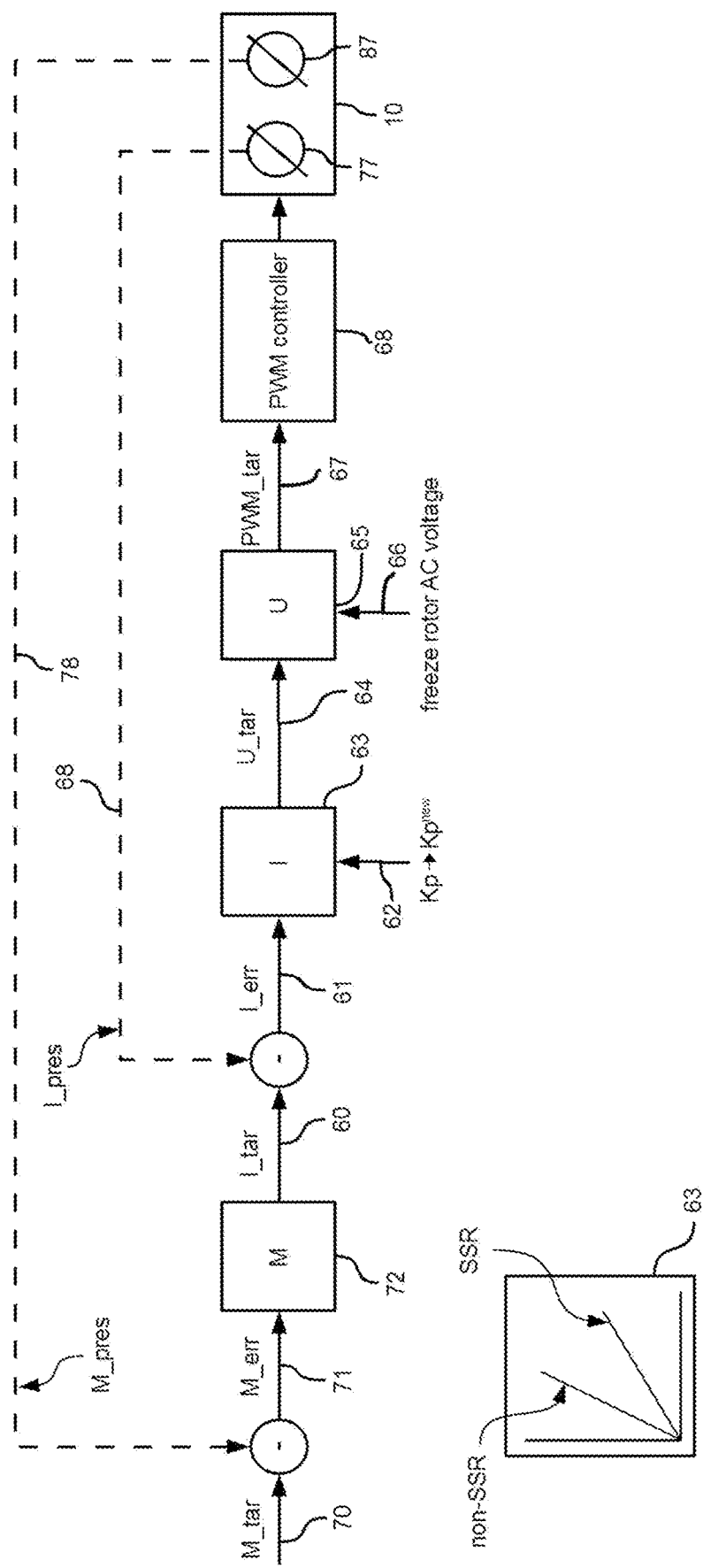
FIG. 10 is a schematic block-diagram illustrating an exemplary control loop of a rotor-current controller, when a change from control parameters of a non-SSR-control mode to control parameters of an SSR-control mode is performed.

An exemplary non-transient SSR-control activity 400, which is part of the control method shown in FIG. 6, is illustrated by the schematic block-diagram of FIG. 9.

In a first activity, the rotor-current controller common gain "Kp" is altered by decreasing the value of "Kp" to a predetermined value that is effective to dampen the effect of an SSR-event responsive to a predetermined series-compensation level of 70 percent, hence a severe SSR-event, on the wind turbine. The predetermined value of the rotor-current controller common gain "Kp" has been obtained in a computer-simulation of the DFIG wind turbine architecture in an SSR-event corresponding to a series-compensation level of 70 percent. Furthermore, the integral time constant of the rotor-current controller, realized as a proportional-integral controller is also altered to a predetermined value which is effective in dampening the impact of such a 70 percent series-compensation level SSR-event. The integral time constant of the rotor-current controller is also referred to as "$T_1$" in this description of embodiments. Also the predetermined value of the integral time constant of the rotor-current controller is also obtained in a computer simulation of the DFIG wind turbine architecture in an SSR-event corresponding to a series-compensation level of 70 percent.

Taking this at least one controller parameter value (the values of "Kp" and "$T_1$") as a starting point, the rotor-current controller gain "Kp" is iteratively altered (in this case increased) by multiplying said controller gain "Kp" by 1.01. At substantially the same time, the rotor-current controller's time constant "$T_1$" is altered (in this case decreased) by multiplying said time constant "$T_1$" by 0.99. While performing these iterative changes of control parameters "Kp" and "$T_1$", an output-power oscillation is induced by the SSR-event which is continuously monitored as described in conjunction with FIG. 6. When such power oscillations at the SSR-frequency are detected, due to the change of "Kp" and "$T_1$" towards control parameters of the rotor-current controller of the non-SSR operation mode, "Kp" and "$T_1$" are set to the last value (typically one step towards the control parameters effective to dampen the impact of the severe SSR-event on the wind turbine) that did not cause such a power-oscillation.

If the control parameter pair "Kp", "$T_1$" assumes values in a certain range, corresponding to an SSR-event that is more severe than that actually acting on the wind turbine, these output-power oscillations do not occur and are therefore not monitored. However, a decreased rotor-current controller common gain "Kp" and an increased time constant "$T_1$" also impairs performance of the wind turbine converter system, hence they are adjusted to values that are effective in dampening the effect of the SSR-event on the wind turbine, but, only impair the converter-systems performance to a minimal extent.

However, it should be mentioned here, in the examples provided by the methods discussed in conjunction with FIG. 8, that the rotor-current parameters can be changed by only decreasing the rotor-current common gain "Kp" or only increasing the integral time constant $T_1$.

A schematic block diagram of a control-loop of a rotor-current controller is illustrated by FIG. 9. A torque target value 70 is subtracted from a measured torque value 78, obtained by a torque-sensor 87 located at the rotor of generator 10, to determine a torque error signal 71. The torque error signal 71 is provided to a torque controller 72. The torque controller 72 sets a rotor-current target value 60 such that the torque target value 70 is reached. The rotor-current target value 60 is subtracted from a measured rotor-current value 68, obtained by a current sensor 77 located at the rotor of generator 10, to determine a rotor-current error signal 61.

This rotor-current error signal 61 is provided to the rotor-current controller 63 to determine a rotor voltage target signal 64. The voltage target signal 64 is transferred to a pulse-width-modulation (PWM) switching pattern by a voltage controller 65. The PWM switching pattern (PWM target) 67 is provided to a PWM controller 68 that controls conversion operation of the generator-side inverter such that the rotor-current target value 60 and the superordinate torque target value 70 are reached.

When an SSR-event is detected in the transient SSR-control activity, the rotor AC voltages are frozen by the voltage controller 65, as indicated by the freeze-rotor-AC-voltage command 66.

In the non-transient SSR-control activity, the response of the rotor-current controller 63 to a rotor-current error signal is changed. To make this point clearer the rotor-current controller and its response to a rotor-current error signal are illustrated in FIG. 9 both for a rotor-current controller common gain "Kp" in the non-SSR control mode and for a decreased rotor-current controller common gain "$Kp^{new}$" in the SSR-control mode when performing the non-transient SSR-control activity. As can be seen in this illustration, the control action in response to a certain rotor-current error signal is higher in the non-SSR control mode (curve "non-SSR") than when performing the non-transient SSR-control activity of the SSR-control mode (curve "SSR").

Although certain products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of controlling a converter system of a doubly-fed induction generator (DFIG) wind turbine, the method comprising:
    detecting a sub-synchronous resonance (SSR) event acting on the DFIG wind turbine;
    switching from a non-SSR-control mode to a SSR-control mode in response to detecting the SSR event, wherein the SSR-control mode comprises freezing rotor AC voltages, and at least one of:
    (i) altering at least one rotor-current-controller gain, and
    (ii) altering at least one rotor-current-controller time constant;
    detecting an absence of the SSR event; and
    switching from the SSR-control mode to the non-SSR-control mode in response to detecting the absence of the SSR event, wherein at least one control parameter of the rotor-current-controller is changed back to a non-SSR-control mode value held by the rotor-current-controller before the SSR-control mode was entered.

2. The method of claim 1, wherein the SSR-control mode further comprises at least one of:
    (i) performing the altering of the at least one rotor-current-controller gain by decreasing the at least one rotor-current-controller gain, and
    (ii) performing the altering of the at least one rotor-current-controller time constant by increasing the at least one rotor-current-controller time constant.

3. The method of claim 1, wherein the SSR-control mode comprises a transient SSR-control activity and a non-transient SSR-control activity, wherein the transient SSR-control activity comprises freezing the rotor AC voltages in magnitude and phase, and wherein the non-transient SSR-control activity comprises the at least one of (i) decreasing at least one rotor-current-controller gain and (ii) increasing at least one rotor-current-controller time constant.

4. The method of claim 1, wherein the SSR event is detected by filtering at least one of (i) stator-currents or (ii)

stator-voltages to detect sub-synchronous components of the stator-currents or the stator-voltages or by monitoring power-output oscillations.

5. The method of claim 4, wherein at least one of (i) stator-currents and (ii) stator voltage are filtered by a band-pass filter, responsive to a frequency band of 15 to 45 Hz.

6. The method of claim 3, wherein the transient SSR-control activity comprises an active damping of the SSR event by injecting at least one of active and reactive power in antiphase to a SSR oscillation into an electricity-grid by a grid-side inverter of the converter system.

7. The method of claim 6, wherein active damping of the SSR event by the grid-side inverter of the converter system and freezing the rotor AC voltages are performed substantially simultaneously.

8. The method of claim 1, wherein decreasing the at least one rotor-current-controller gain comprises decreasing a rotor-current-controller common gain.

9. The method of claim 1, wherein increasing the at least one rotor-current controller time constant comprises increasing a rotor-current-controller integral time constant.

10. The method of claim 1, wherein the rotor-current-controller is a proportional-integral controller.

11. The method of claim 1, wherein at least one of the rotor-current-controller gain and the rotor-current-controller time constant is altered to at least one predetermined value effective to dampen an effect of the SSR event on the wind turbine that is responsive to a predetermined series compensation level of a power-transmission line.

12. The method of claim 11, wherein at least one of the rotor-current-controller gain and the rotor-current-controller time constant is adjusted from the at least one predetermined value effective to dampen the predetermined series compensation level towards at least one value of the non-SSR-control mode.

13. The method of claim 1, wherein the SSR-control mode comprises determining, based on measured power-output values, whether the SSR event is critical for further operation of the wind turbine and shutting down the wind turbine when the SSR event is determined to be critical for further operation of the wind turbine.

14. A converter system arranged to control a doubly fed induction generator (DFIG) wind turbine, the converter system being arranged to:

detect a sub-synchronous resonance (SSR) event,
switch from a non-SSR-control mode to a SSR-control mode, in response to detecting the SSR event, wherein the SSR-control mode comprises freezing rotor AC voltages and at least one of:
(i) altering at least one rotor-current-controller gain
(ii) altering at least one rotor-current-controller time constant; and
switch from the SSR-control mode to the non-SSR-control mode in response to detecting that the SSR event is absent, wherein at least one control parameter of the rotor-current-controller is changed back to a non-SSR-control mode value held by the rotor-current-controller before the SSR-control mode was entered.

15. The converter system of claim 14, wherein detecting that the SSR event is absent comprises: no longer detecting sub-synchronous generator-stator current-components for a given period of time.

16. A method of controlling a converter system of a doubly-fed induction generator (DFIG) wind turbine the method comprising:

detecting a sub-synchronous resonance (SSR) event acting on the DFIG wind turbine;
switching from a non-SSR-control mode to a SSR-control mode in response to detecting the SSR event, wherein the SSR-control mode comprises a non-transient SSR-control activity that comprises both (i) decreasing at least one gain of a rotor-current-controller, and (ii) increasing at least one time constant of the rotor-current-controller; and
switching from the SSR-control mode to the non-SSR-control mode in response to detecting an absence of the SSR event, wherein both the at least one gain and the at least one time constant of the rotor-current-controller are changed back to a non-SSR-control mode value held by the rotor-current-controller before the SSR-control mode was entered.

17. The method of claim 16, wherein detecting the absence of the SSR event comprises: no longer detecting sub-synchronous generator-stator current-components for a given period of time.

18. The method of claim 1, wherein detecting the absence of the SSR event comprises: no longer detecting sub-synchronous generator-stator current-components for a given period of time.

* * * * *